(12) United States Patent
Fegely et al.

(10) Patent No.: US 11,440,643 B2
(45) Date of Patent: Sep. 13, 2022

(54) NONLINEAR FLY-BY-WIRE AIRCRAFT CONTROL

(71) Applicant: Bell Textron Inc., Fort Worth, TX (US)

(72) Inventors: Cody Fegely, Irving, TX (US); Kenneth Stephen Wittmer, Sandy Hook, CT (US)

(73) Assignee: Textron Innovations Inc., Providence, RI (US)

( * ) Notice: Subject to any disclaimer, the term of this patent is extended or adjusted under 35 U.S.C. 154(b) by 138 days.

(21) Appl. No.: 17/083,900

(22) Filed: Oct. 29, 2020

(65) Prior Publication Data
US 2022/0135210 A1 May 5, 2022

(51) Int. Cl.
| | | |
|---|---|---|
| *B64C 13/00* | (2006.01) | |
| *B64C 13/50* | (2006.01) | |
| *B64C 27/04* | (2006.01) | |
| *B64C 27/57* | (2006.01) | |
| *B64C 27/82* | (2006.01) | |

(52) U.S. Cl.
CPC ............ *B64C 13/503* (2013.01); *B64C 27/04* (2013.01); *B64C 27/57* (2013.01); *B64C 2027/8209* (2013.01)

(58) Field of Classification Search
CPC ....... B64C 13/503; B64C 27/04; B64C 27/57; B64C 2027/8209
See application file for complete search history.

(56) References Cited

U.S. PATENT DOCUMENTS

2016/0001877 A1* 1/2016 Paulos .................... H02P 7/29
701/3

* cited by examiner

*Primary Examiner* — Ian Jen
(74) *Attorney, Agent, or Firm* — Akona IP PC

(57) ABSTRACT

There is disclosed in one example a flight control computer for a rotary aircraft, including: a first interface to communicatively couple to a flight control input; a second interface to communicatively couple to flight geometry actuators; a data source; a multi-dimensional lookup table including a data structure to correlate flight control inputs to flight geometry actuator outputs according to a third-factor; and circuitry and logic instructions to: receive an input via the first interface; query the data source for the third-factor; query the multi-dimensional lookup table for a control input modifier according to the flight control input and the third-factor; and compute and send via a third interface a flight geometry output according to the control input modifier.

20 Claims, 5 Drawing Sheets

NONLINEAR FLY-BY-WIRE AIRCRAFT CONTROL

GOVERNMENT RIGHTS

This invention was made with Government support under Agreement No. W911W6-19-9-0002, awarded by the Army Contracting Command-Redstone Arsenal. The Government has certain rights in the invention.

TECHNICAL FIELD

This disclosure relates generally to aircraft devices and, more particularly, to a system and method of providing nonlinear fly-by-wire aircraft control.

SUMMARY

In an example, there is disclosed a flight control computer for a rotary aircraft, comprising: a first interface to communicatively couple to a flight control input; a second interface to communicatively couple to flight geometry actuators; a data source; a multi-dimensional lookup table comprising a data structure to correlate flight control inputs to flight geometry actuator outputs according to a third-factor; and circuitry and logic instructions to: receive an input via the first interface; query the data source for the third-factor; query the multi-dimensional lookup table for a control input modifier according to the flight control input and the third-factor; and compute and send via a third interface a flight geometry output according to the control input modifier.

BRIEF DESCRIPTION OF THE DRAWINGS

To provide a more complete understanding of the present disclosure and features and advantages thereof, reference is made to the following description, taken in conjunction with the accompanying figures, in which like reference numerals represent like elements.

DETAILED DESCRIPTION

Figure 1:
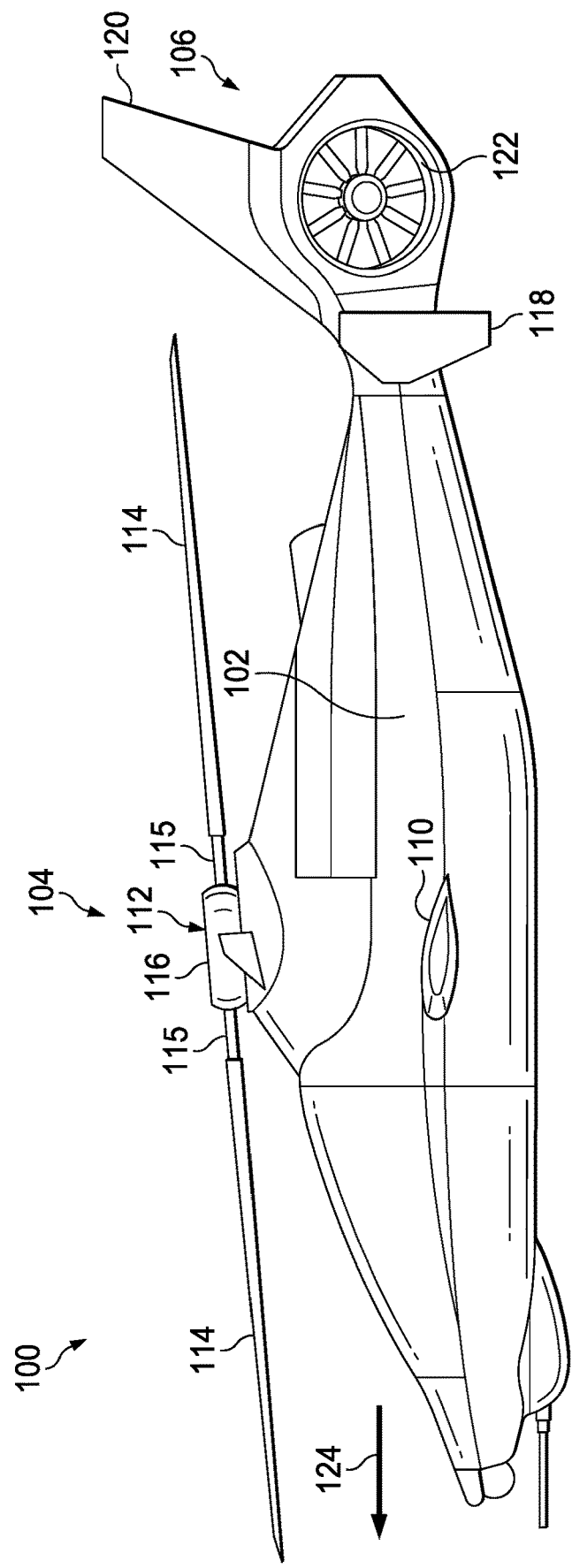
FIG. 1 illustrates a side view of an example aircraft in accordance with certain embodiments of the present disclosure for a mechanism for implementing internal payload extension and retraction.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions may be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above," "below," "upper," "lower," "top," "bottom" or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature) of an element, operations, and/or conditions, the phrase "between X and Y" represents a range that includes X and Y.

Further, as referred to herein in this Specification, the terms "forward," "aft," "inboard," and "outboard" may be used to describe relative relationship(s) between components and/or spatial orientation of aspect(s) of a component or components. The term "forward" may refer to a special direction that is closer to a front of an aircraft relative to another component or component aspect(s). The term "aft" may refer to a special direction that is closer to a rear of an aircraft relative to another component or component aspect(s). The term "inboard" may refer to a location of a component that is within the fuselage of an aircraft and/or a spatial direction that is closer to or along a centerline of the aircraft relative to another component or component aspect(s), wherein the centerline runs in a between the front and the rear of the aircraft. The term "outboard" may refer to a location of a component that is outside the fuselage-of an aircraft and/or a special direction that farther from the centerline of the aircraft relative to another component or component aspect(s).

Still further, the present disclosure may repeat reference numerals and/or letters in the various examples. This repetition is for the purpose of simplicity and clarity and does not in itself dictate a relationship between the various embodiments and/or configurations discussed. Example embodiments that may be used to implement the features and functionality of this disclosure will now be described with more particular reference to the accompanying FIGURES.

Traditional or analog aircraft receive control inputs via a control yoke, or similar. The control yoke may be connected via cables to control inputs, which provide the actual control of the aircraft. For example, in a helicopter, a traditional control yoke may be connected via gears to cables that mechanically interface to a rotor control system, which may include a tilt ball, pitch links, and other control inputs. The gearing provides a 1:n control ratio, wherein one unit of input motion is translated to n units of motion in the rotor control system.

Modern "fly-by-wire" systems are more complex than simple mechanical analog systems, but may provide greater flexibility. For example, a fly-by-wire system may trade off analog aerodynamic stability for increased speed and/or maneuverability. In a fly-by-wire system, a flight computer (which may be multiply redundant) receives control inputs from the pilot, and translates those electronically via electronic actuators into motion of the control surfaces of the aircraft. A flight computer may not only translate these motions, but may also make real-time corrections to control surfaces to maintain stable flight that would not be feasible without high-speed corrections by the flight computer.

A traditional fly-by-wire system for a rotorcraft, such as a helicopter, may provide an electronic analog to a geared control system. For example, the system may provide a similar 1: n control input translation, wherein one unit of motion from the control input is translated into n units on the physical control surfaces. However, the dynamics of real-world flight make this type of system less than optimal for at least some configurations.

An improved fly-by-wire system may provide nonlinear translation of control inputs. For example, a pilot may control the aircraft via an inceptor, which may be for example a joystick inceptor, or other control means. In one illustrative example, the inceptor receives control inputs, which represent the pilot's intended flight path. A flight computer or controller may then process those inputs, and transform those inputs nonlinearly into outputs on control surfaces, via actuators. In some examples, the flight computer may also make real-time corrections to improve stability and performance, which real-time corrections may not be feasible for a human operator.

By way of illustration, when translating a control input on the inceptor, the flight computer may account for multiple variables. In addition to the displacement of the inceptor itself in a particular direction, the computer may also account for other variables such as airspeed, yaw, pitch, roll, landing gear position, the position of other flight surfaces, aircraft loading (weight and center of gravity), the current aerodynamics of flight, Mach number, (on a military aircraft) whether a main gun or other weapons are being fired, the presence of threats, or other factors.

Figure 3:
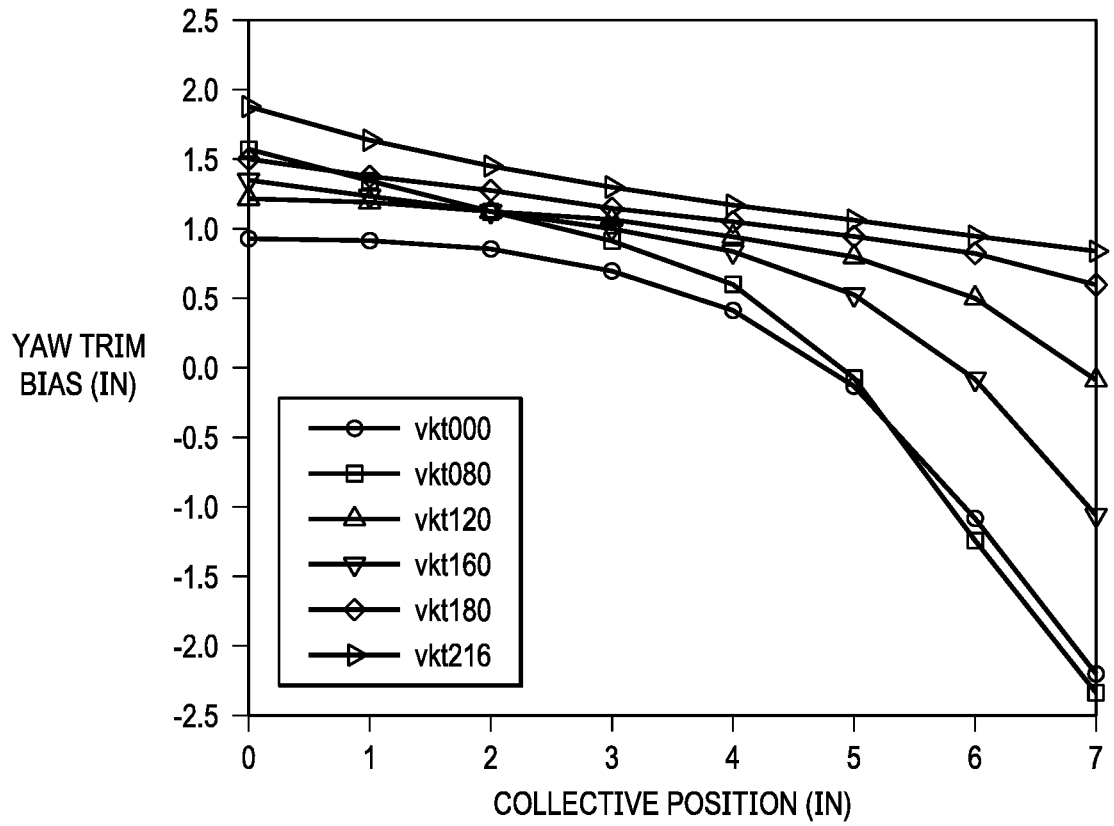
FIG. 3 is a graph illustrating a gain profile.

In an example, the flight computer maintains a number of data structures, such as lookup tables, that include translations from control inputs to control outputs. As illustrated in FIG. 3, the translation of these control inputs may be nonlinear. For example, as the inceptor moves more sharply or drastically in one direction, the sensitivity of the control input may taper off. This may prevent overcorrection or catastrophic motions that may overextend the aircraft's ability to function, and possibly cause system failure. For example, a pilot encountering an obstacle on the starboard side of the aircraft may yank the inceptor hard to the port side, indicating a desire to move to port so as to avoid the obstacle. In a traditional analog control system, if the pilot yanks too far to port, he or she may overwhelm the ability of the aircraft to account for the motion, and could potentially crash. To limit extreme cases of such inputs, analog control systems may include a hardstop, which physically limits the ability of the control surface to move farther.

In an illustrative example of the fly-by-wire system of the present Specification, the flight computer may provide a virtual hardstop, which provides an upper limit to the allowable motion of aircraft control surfaces. This virtual hardstop could be a static limit, indicating a maximum allowable value, or it could be a dynamic limit that adjusts according to flight conditions and other variables. In some cases, the acceleration of the control input may be a variable that is considered in translating control inputs. For example, if the pilot nudges the inceptor gently toward port, this may be indicative of a desire on the part of the pilot to gently move to port, such as for changing direction under normal circumstances. However, a high acceleration to port may indicate a sense of urgency on the part of the pilot, such as when trying to avoid an obstacle that has been suddenly observed on the starboard side. In this case, the control input may be translated by the flight computer more aggressively, but still within the performance capabilities of the aircraft. In the case of the gentle nudge to the left, the virtual hardstop may be placed more conservatively than in the case of the sharp yank to the left. Furthermore, the nonlinear translation may be more aggressive for the sharp yank than for the gentle nudge.

In an illustrative example, after receiving a control input for a particular axis of motion, or for a desired acceleration, the flight computer may check lookup tables or other data structures to determine the appropriate nonlinear translation of the control input in light of all available factors. The translation gain may then be summed or convoluted with the original control input, to provide a final control input value that is to be provided to the appropriate control surfaces. As appropriate, this final control input value may first be filtered through a virtual hardstop, to ensure that the control inputs do not exceed the safe operational performance parameters of the aircraft.

In addition to embodiments that use lookup tables, other data structures or methods could be provided. For example, instead of a lookup table, a multi-dimensional or multivariable control function could be mathematically computed by the flight computer. This mathematical function could be, for example, underdamped, overdamped, or critically damped, depending on the parameters. Furthermore, the amount of damping in the dynamic formula could be adjusted depending on factors within a lookup table, such as airspeed, acceleration of the control input, or other factors. Thus, the use of lookup tables can also be combined, in some embodiments, with the use of control equations with appropriate static or dynamic damping.

Referring to FIG. 1, illustrated therein is an example embodiment of an aircraft, which in the illustrated example is a rotorcraft 100. FIG. 1 portrays a side view of rotorcraft 100, which includes a fuselage 102, a primary rotor system 104, and an empennage 106. The fuselage 102 is the main body of the rotorcraft 100, which may include a cabin (e.g., for crew, passengers, and/or cargo) and/or may house certain mechanical components, electrical components, etc. (e.g., engine(s), transmission, flight controls, etc.). In accordance with features of embodiments described herein, the fuselage 102 also includes a payload bay covered by a payload bay door 108 disposed under a wing 110, which in some embodiments includes a support structure and actuation mechanism for extending externally stowed payload (e.g., weapons) outboard away from the fuselage 102 to a firing position. It will be recognized that, although not shown in the view illustrated in FIG. 1, the opposite side of the rotorcraft 100 also includes a wing and a payload bay door corresponding to the wing 110 and payload bay door 108.

The rotor system 104 is used to generate lift for rotorcraft 100. For example, the rotor system 104 (also generally referred to as the "rotor") may include a rotor hub 112 (also referred to as a "rotor hub assembly" or more generally as a "hub") coupled to a plurality of rotor blades 114 (also referred to generally as "blades"). Torque generated by the engine(s) of the rotorcraft causes the rotor blades 114 to rotate, which generates lift. The empennage 106 of the rotorcraft 100 includes a horizontal stabilizer 118, a vertical stabilizer 120, and a tail rotor or anti-torque system 122. Although not shown in the view illustrated in FIG. 1, a corresponding horizontal stabilizer is disposed on the other side of the rotorcraft 100 opposite the horizontal stabilizer 118. The horizontal stabilizer 118 and vertical stabilizer 120 respectively provide horizontal and vertical stability for the rotorcraft 100. Moreover, tail rotor or anti-torque system 122 may be used to provide anti-torque and/or direction control for the rotorcraft 100.

Rotorcraft 100 relies on rotor system 104 for flight capabilities, such as controlling (e.g., managing and/or adjusting) flight direction, thrust, and lift of the rotorcraft. For example, the pitch of each rotor blade 114 can be controlled using collective control or cyclic control to selectively control direction, thrust, and lift of the rotorcraft 100. During collective control, all the of rotor blades 114 are collectively pitched together (e.g., the pitch angle is the same for all blades), which effects overall thrust and lift. During cyclic control, the pitch angle of each of the rotor blades 114 varies depending on where each blade is within a cycle of rotation (e.g., at some points in the rotation the pitch angle is not the same for all blades), which can affect direction of travel of the rotorcraft 100.

Aircraft such as rotorcraft 100 can be subjected to various aerodynamic and operational forces during operation, such as lift, drag, centrifugal force, aerodynamic shears, and so forth. Lift and centrifugal force, for example, are forces produced by the rotation of a rotor system. Lift is an upward force that allows a rotorcraft to elevate, while centrifugal force is a lateral force that tends to pull the rotor blades outward from the rotor hub. These forces can subject the rotor hub, rotor yoke, and/or the rotor blades (referred to herein using the terms "hub/blades," "yoke/blades," "hub/yoke/blades," and variations thereof) to flapping, leading and lagging, and/or bending. For example, flapping is a result of the dissymmetry of lift produced by rotor blades at different positions (typically referred to as "pitch" or "pitch angles") during a single rotation. During rotation, for example, a rotor blade may generate more lift while advancing in the direction of travel of the rotorcraft than while retreating in the opposite direction. A rotor blade may be flapped up (also sometimes referred to as being pitched "nose-up") while advancing in the direction of travel, and may flap down (e.g., pitched "nose-down") while retreating in the opposite direction. When a blade is pitched more nose-up, more lift is created on that blade, which will drag the side of the rotor/hub upward, which makes the hub/yoke flap. For example, for rotorcraft 100, the most aft blade (e.g., nearest to tail rotor or anti-torque system 122) of the rotor system 104 may be pitched more nose-up and the most forward blade may be pitched more nose-down; to provide a forward direction of travel (as generally indicated by arrow 124) for rotorcraft 100.

Figure 2:
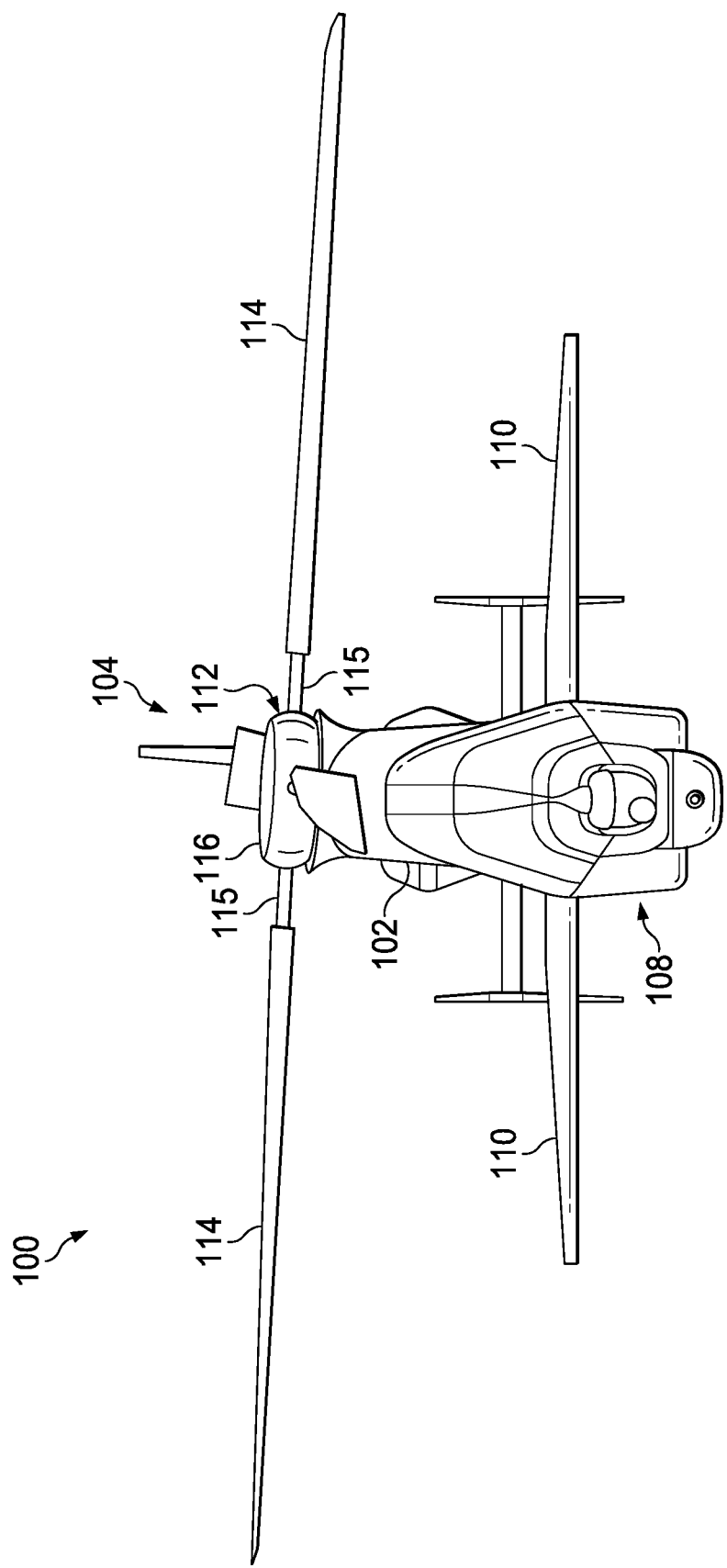
FIG. 2 illustrates a front plan view of the aircraft of FIG. 1 in which payload is retracted and stowed in payload bay.

Referring now to FIG. 2, illustrated therein are front plan views of rotorcraft 100 of FIG. 1. FIG. 2 illustrates rotorcraft 100 with payload bay doors 108 closed, wherein a payload is stowed within respective payload bays.

FIG. 3 is a graph illustrating a gain profile 300. In this case, gain profile 300 is bucketized according to airspeed, which acts as a third or environmental factor to adjust a control input. Gain profile 300 receives as an input collective position in inches, and provides as an output a yaw trim bias in inches (or alternatively, a gain value), as modified by airspeed. There are separate gain curves for different bucketized airspeed ranges. It should be understood that other control inputs could also be used, and in the case of an inceptor, there may be multiple control inputs. In the case of multiple control inputs, there may be separate lookup tables to provide separate gain profiles for each control input. Thus, gain profile 300 and its associated graph should be understood as a representative example that could also be applied to pitch, roll, and even a throttle.

In the example of FIG. 3, gain profile 300 includes bucketized gain curves according to airspeed. For example, there is a gain curve that corresponds to an airspeed between 0 and less than 80 knots, a gain curve corresponding to an airspeed between 80 and less than 120 knots, a gain curve according to an airspeed of 120 and less than 160 knots, a gain curve for 160 up to less than 180 knots, and a gain curve for 180 up to less than 216 knots. If 216 knots is not the maximum airspeed of the rotary aircraft, then there may also be a gain curve for any value greater than 216.

Qualitatively, it can be seen that there is an inflection point at approximately 4 inches displacement of the collective position. Up to the inflection point of 4 inches, the gain curves are relatively flat. For example, at lower air speeds, a collective displacement of between 0 and 4 inches corresponds to a yaw trim bias displacement between 0.5 and 1.0 inches.

At lower air speeds, the gain curve drops off relatively dramatically. For example, at 7 inches displacement of the collective, the yaw trim bias displacement is nearly −2.5 inches.

However, at higher air speeds, the overall curve is closer to linear, and has no dramatic drop-off. For example, at an airspeed greater than 216, between 0 and 7 inches collective displacement, the yaw trim bias displacement ranges between just under 1.5 inches and 2.0 inches.

In other words, at lower speeds, it may be necessary to provide a much greater yaw trim bias to provide stable flight, particularly in cases where there is a large collective displacement, indicating that the pilot intends a sharper maneuver.

Figure 4:
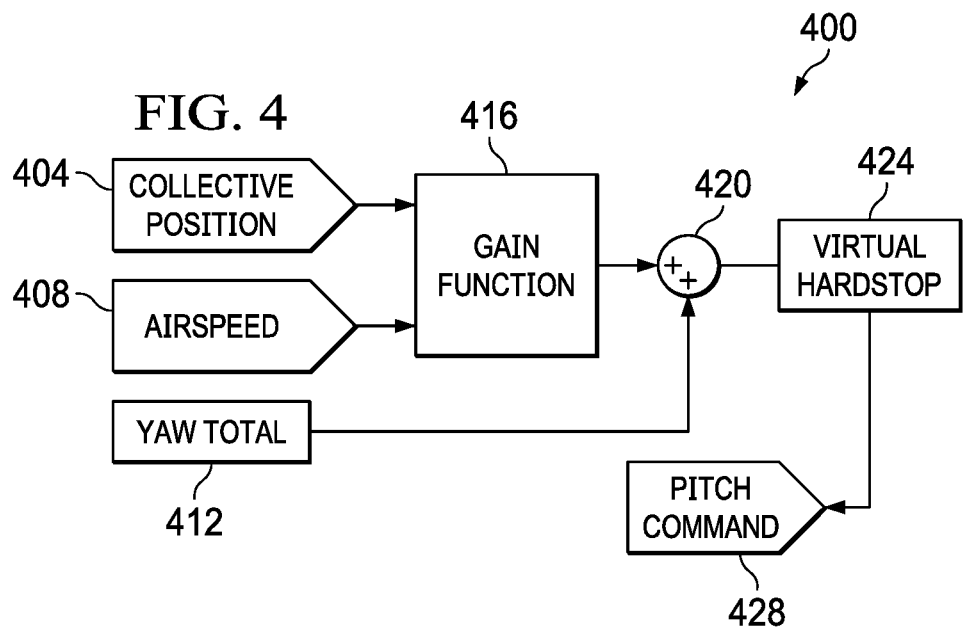
FIG. 4 is a transfer function diagram.

FIG. 4 is a transfer function diagram 400 which may provide, for example, a series of gain profile curves as illustrated in FIG. 3.

Block 404 collects, for example, a collective position or displacement. Block 408 collects a third-factor, or otherwise an environmental or ambient factor, as described herein. In this case, the third-factor is airspeed. Airspeed 408 and collective position 404 are provided to a gain function 416, which may have access to a multi-dimensional lookup table or gain translation table, which may be bucketized as illustrated in FIG. 3. This lookup table receives both collective position and airspeed as input, and then provides a gain function that is a function of both collective position and airspeed, as illustrated. This is summed in summation block 420 with a yaw total 412, and may be filtered, for example, through a virtual hardstop 424 to provide a final pitch command 428.

Virtual hardstop 424 may be a virtual control limit, and stands in the place of physical hardstops in prior art analog control systems. Virtual hardstop 424 ensures that control surfaces do not exceed certain performance parameters, which could cause catastrophic failure in the system. Advantageously, virtual hardstop 424 may itself be an adjustable factor that may be queried via a lookup table, and may be affected by a third-factor or environmental factor, such as airspeed or acceleration.

Again, note that FIG. 4 illustrates only the control of a pitch output according to collective position, airspeed, and a yaw bias. In general terms, in a fly-by-wire system, there may be controls to affect yaw, pitch, and roll of the rotary aircraft, and these may be controlled by various actuators that displace control surfaces. For example, control surfaces that could be displaced include ailerons, rudders, and tail rotors, in addition to two-dimensional displacement of a main rotor, by way of illustrative and nonlimiting example.

Figure 5:
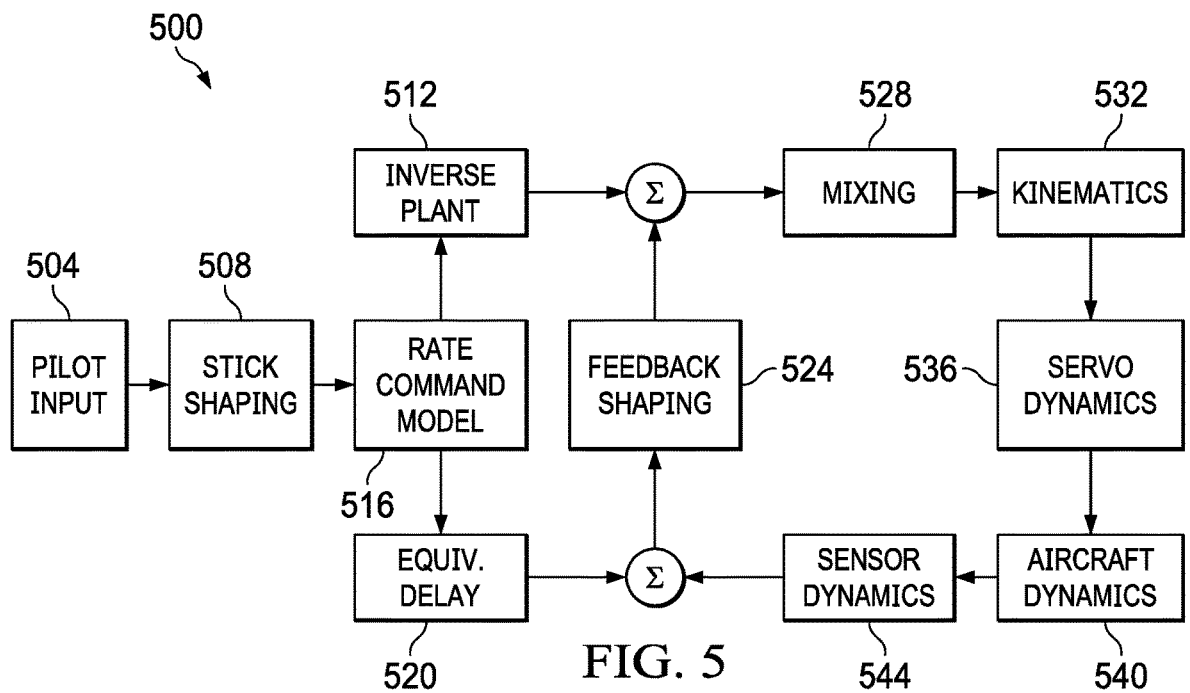
FIG. 5 is a block diagram of selected elements of a fly-by-wire control system.

FIG. 5 is a block diagram of selected elements of a fly-by-wire control system 500. Fly-by-wire control system 500 is illustrated as a system for use with a rotary aircraft. Fly-by-wire control system 500 could also be adapted to be used with other systems, including fixed-wing aircraft and other control systems.

In block 504, a pilot input is provided. For example, the pilot may move a collective, yaw pedals, a cyclic, and/or a throttle. Alternatively, the pilot may manipulate a single inceptor with, for example, three to four different axes of movement. An inceptor could have X and Y axes to respectively control roll and pitch, a "twist" axis to control yaw, and a linear movement axis for the throttle. Other configurations are also possible.

In stick shaping block 508, the pilot inputs may be broken down into component vectors. For example, X, Y, twist, and linear axis inputs could be separated from one another, as these represent separate inputs from the perspective of the control surfaces.

In rate command model 516, a gain profile, such as gain profile 300 of FIG. 3 or similar, may be used to calculate the gain on each input according to the inputs themselves, and according to optional environmental inputs.

The rate command model may yield an equivalent delay 520, which can be summed in with sensor dynamics 544 into feedback shaping 524. Sensor dynamics 544 may provide the environmental or modifier inputs to rate command model 516.

Rate command model 516 may also yield an inverse plant 512. Inverse plant 512 functions to approximately cancel the augmented aircraft dynamics. By doing so, the aircraft response will closely match the command model using inputs only from the feed-forward control path. This ensures that the majority of the feedback is reserved for rejection of external disturbances. Inverse plant 512 can be summed with feedback shaping 524.

In mixing block 528, the various inputs are mixed together into a single actuation value for a particular flight surface. For example, mixing 528 could yield an actuator displacement for a rotor yoke, which may change the tilt or angle of the rotor. It could also yield a drive value for a tail rotor, which may change the yaw. There may also be fight surfaces such as ailerons, rudders, and/or flaps, which may also have actuators that have a calculated displacement according to kinematics block 532.

Servo dynamics 536 imparts the desired displacement to the actual servos or actuators that carry out the desired change to flight geometry services.

This provides a model of aircraft dynamics 540, which may include, for example, the airspeed, acceleration, or other performance characteristics of the aircraft, which may be read by sensor dynamics 544.

Figure 6:
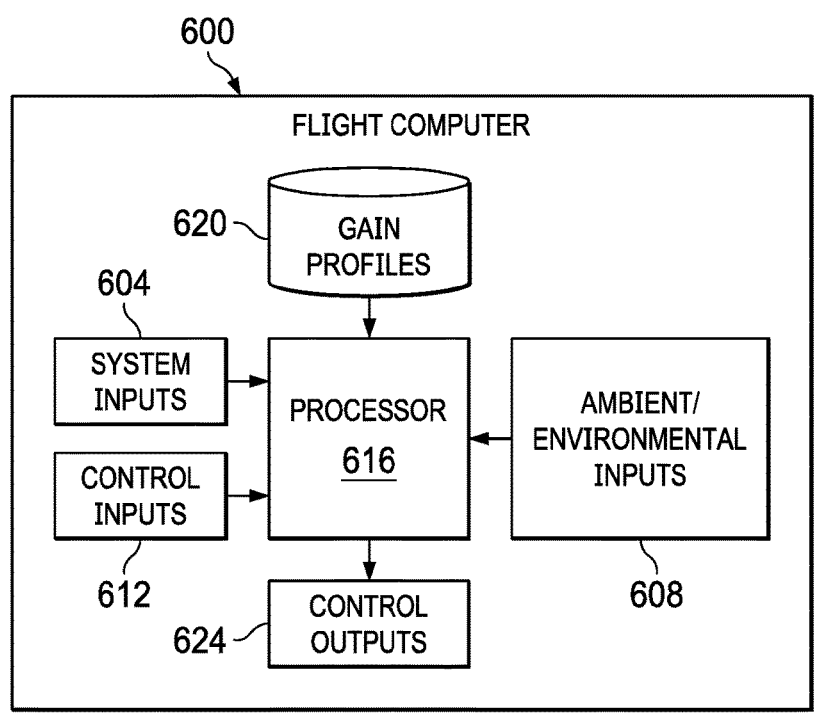
FIG. 6 is a block diagram of a flight computer.

FIG. 6 is a block diagram of a flight computer 600. Selected elements of flight computer 600 are shown to illustrate certain operational principles of the present Specification.

Flight computer 620 includes a hardware platform which may include a processor 616, and which may also include static and/or dynamic memory. Gain profiles 620 are stored in a data structure, which could be a multi-dimensional (e.g., n-dimensional, n>2) lookup table, as illustrated in FIG. 3. Processor 616 receives gain profiles 620, as well as other inputs, including ambient or environmental input 608, system input 604, and control inputs 612. For example, ambient or environmental input 608 could include ambient sensors for airspeed, outside air temperature, engine temperature, oil pressure, acceleration, or the current yaw, tilt, or roll of the aircraft. System input 604 could include inputs from aircraft systems such as safety systems, fire control systems, weapon systems, or other aircraft systems that may affect performance. Control input 612 may include inputs from an inceptor, for example, or from a collective, a cyclic, pedals, and/or a throttle.

According to these various inputs, processor 616 computes control output 624, which may include, for example, displacements of certain actuators or servos. These values are sent to the various actuators and/or servos, which may then actuate certain control surfaces to carry out the desired controls on the aircraft.

Figure 7:
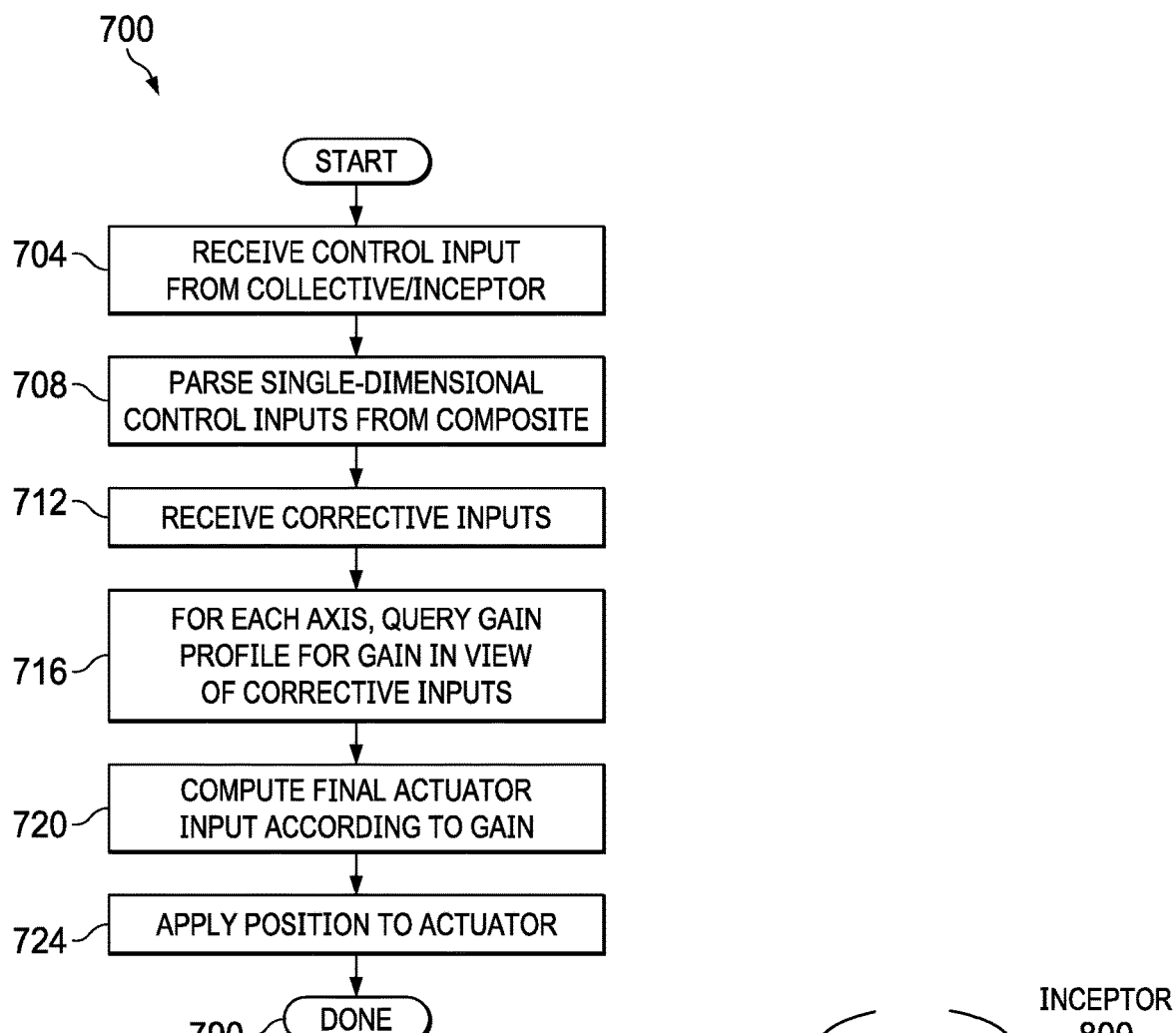
FIG. 7 is a flowchart of a method of providing control inputs.

FIG. 7 is a flowchart of a method 700 of providing control inputs, according to the teachings of the present Specification.

In block 704, the system receives control inputs from various controls, such as pilot controls that may include a collective, an inceptor, or other controls.

In block 708, the system parses single-dimensional control inputs from the composite control inputs received in block 704. For example, the single-dimensional control inputs could include yaw, pitch, roll, and/or throttle. Inputs could also be divided according to actuators or servos.

In block 712, the system receives corrective inputs. These include inputs that are used to select, for example, a gain curve as illustrated in FIG. 3. These corrective inputs may be bucketized in some examples, and may include one or more corrective or adjustment factors.

In the present Specification, airspeed has been used as an illustrative corrective input, but any other corrective input could be used.

In block 716, for each axis, or for each single-dimensional input parsed out from block 708, the system queries a gain profile for the gain to be applied to the input in view of the corrective inputs. For example, in FIG. 3, the collective position is modified according to the airspeed to yield a yaw trim bias gain. This is provided as a single example, and many other examples have been provided throughout this Specification.

In block 720, the system computes a final actuator input according to the gain and the gain profile.

In block 724, the system applies the desired position to the actuator, such as, for example, by sending a signal to the actuator to cause the actuator to move to the desired position to change a flight control surface, and to impart to the aircraft the desired motion.

In block 790, the method is done.

Figure 8:
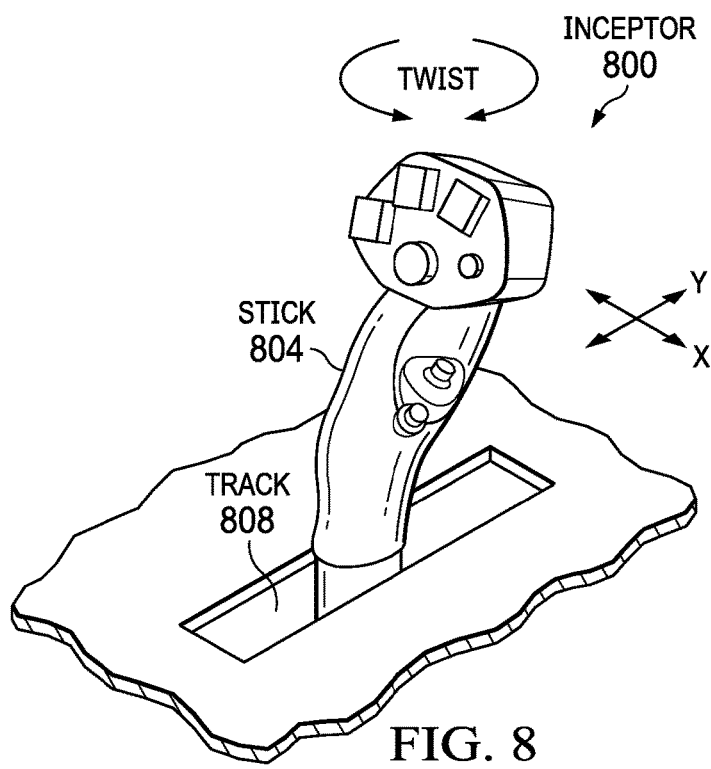
FIG. 8 is a perspective view of an illustrative example of an inceptor.

FIG. 8 is a perspective view of an illustrative example of an inceptor 800.

Inceptor 800 may replace the traditional controls for a helicopter in a more advanced fly-by-wire aircraft. For example, a helicopter may traditionally include separate collective, cyclic, yaw pedal, and throttle inputs. In a modern fly-by-wire helicopter, some or all of these may be replaced by the inceptor. In particular, different inceptor designs may or may not incorporate a throttle design, so in some cases, even in a system with an inceptor 800, there may be a separate throttle.

In this example, inceptor 800 includes a stick 804, which sits inside a track 808. Stick 804 has three degrees of freedom of movement, namely X, Y, and twist. In this case, the X and Y axes control roll and pitch, respectively, and the twist axis or twist freedom of motion may be used to control yaw. In the case where track 808 is provided, inceptor 800 may also slide along track 808, wherein motion along track

808 may be used to control the throttle. For example, pushing stick 804 forward in track 808 may indicate an increase of throttle, while pulling stick 804 back may indicate a decrease in throttle.

It will be recognized that different types/arrangements of doors, as described herein, provide different clearances to the payload and/or the ground and require different actuation systems. Additionally, different door arrangements involve different levels of complexity. For example, some require more rollers or moving parts. Some of the configurations enable the door to be closed after the weapons have been extended into the airstream. The decision to use one configuration versus another is dependent on the aircraft and its intended use, as well as the design space of cost, weight, complexity, and development time.

Additionally, it is possible to attach the section of the fuselage through which the payload sweeps to the munitions launcher itself. This configuration eliminates the complexity of a separate mechanism, but it drives loads and other interfaces into the munitions launcher and does not allow the door to be shut with the weapons extended from the fuselage. In such an embodiment, the fuselage panel would be mounted to the munitions launcher and would move out with it when extended. When retracted, the panel would seat against the fuselage frames and longerons at the top and bottom thereof.

Example 1 is a flight control computer for a rotary aircraft, comprising: a first interface to communicatively couple to a flight control input; a second interface to communicatively couple to flight geometry actuators; a data source; a multi-dimensional lookup table comprising a data structure to correlate flight control inputs to flight geometry actuator outputs according to a third-factor; and circuitry and logic instructions to: receive an input via the first interface; query the data source for the third-factor; query the multi-dimensional lookup table for a control input modifier according to the flight control input and the third-factor; and compute and send via a third interface a flight geometry output according to the control input modifier.

Example 2 is a flight control computer for a rotary aircraft, wherein the control input modifier is a gain.

Example 3 is a flight control computer for a rotary aircraft, wherein the flight control input comprises an inceptor.

Example 4 is a flight control computer for a rotary aircraft, wherein the flight control input comprises a collective, a cyclic, and pedals.

Example 5 is a flight control computer for a rotary aircraft, wherein the flight geometry output comprises an actuator to control blade position.

Example 6 is a flight control computer for a rotary aircraft, wherein the flight geometry output comprises an actuator to control a tail rotor.

Example 7 is a flight control computer for a rotary aircraft, wherein the circuitry and logic instructions are further to provide a virtual hard stop.

Example 8 is a flight control computer for a rotary aircraft, wherein the third-factor comprises airspeed.

Example 9 is a flight control computer for a rotary aircraft, wherein the data structure comprises bucketized gain curves according to ranges of the third-factor.

Example 10 is a flight control computer for a rotary aircraft, wherein the third-factor comprises airspeed.

Example 11 is a flight control computer for a rotary aircraft, wherein the ranges include substantially 0-80 knots, 80-120 knots, 120-160 knots, 160-180 knots, 180-216 knots, and greater than 216 knots.

Example 12 is a flight control computer for a rotary aircraft, wherein the third-factor comprises at least one of airspeed, acceleration, adverse environment, inceptor acceleration, air temperature, ambient pressure, and weapon status.

Example 13 is a flight control computer for a rotary aircraft, wherein the input is a collective input position, the third-factor is an airspeed, the control input modifier is a gain, and the circuitry and logic instructions are to compute a gain function from the collective input position, the airspeed, and the gain, and add a yaw modifier to compute the flight geometry output.

Example 14 is a flight control computer for a rotary aircraft, wherein the third-factor is an ambient or environmental factor.

Example 15 is one or more tangible, non-transitory computer-readable storage media having stored thereon executable instructions to: receive flight control input data; receive a modifying factor; query an n-dimensional lookup table, n>2, for flight control actuations according to the flight control input data and the modifying factor; and drive flight control actuators according to the flight control actuations.

Example 16 is one or more tangible, non-transitory computer-readable storage media, wherein the flight control actuations include a gain.

Example 17 is one or more tangible, non-transitory computer-readable storage media, wherein the flight control input data comprise input from an inceptor.

Example 18 is one or more tangible, non-transitory computer-readable storage media, wherein the flight control input data comprise input from a collective, a cyclic, and pedals.

Example 19 is one or more tangible, non-transitory computer-readable storage media, wherein driving the flight control actuators comprises providing signals to the actuators to control blade position.

Example 20 is one or more tangible, non-transitory computer-readable storage media, wherein driving the flight control actuators comprises providing signals to the actuators to control a tail rotor.

Example 21 is one or more tangible, non-transitory computer-readable storage media, wherein the instructions are further to provide a virtual hard stop.

Example 22 is one or more tangible, non-transitory computer-readable storage media, wherein the modifying factor comprises airspeed.

Example 23 is one or more tangible, non-transitory computer-readable storage media, wherein the n-dimensional lookup table comprises a data structure including bucketized gain curves according to ranges of the modifying factor.

Example 24 is one or more tangible, non-transitory computer-readable storage media, wherein the modifying factor comprises airspeed.

Example 25 is one or more tangible, non-transitory computer-readable storage media, wherein the ranges include substantially 0-80 knots, 80-120 knots, 120-160 knots, 160-180 knots, 180-216 knots, and greater than 216 knots.

Example 26 is one or more tangible, non-transitory computer-readable storage media, wherein the modifying factor comprises at least one of airspeed, acceleration, adverse environment, inceptor acceleration, air temperature, ambient pressure, and weapon status.

Example 27 is one or more tangible, non-transitory computer-readable storage media, wherein the flight control input data is a collective input position, the modifying factor is an airspeed, the flight control actuations include a gain, and the instructions are to compute a gain function from the collective input position, the airspeed, and the gain, and add a yaw modifier to drive the flight control actuators.

Example 28 is one or more tangible, non-transitory computer-readable storage media, wherein the modifying factor is an ambient or environmental factor.

Example 29 is a method of electronically controlling a rotorcraft, comprising: receiving via a first data source a flight control displacement; receiving via a second data source a secondary condition; querying a data structure with the flight control displacement and the secondary condition; and translating the flight control displacement into an actuator displacement according to a gain value received from the data structure.

Example 30 is a method, further comprising driving an actuator according to the actuator displacement.

Example 31 is a method, wherein the first data source comprises an inceptor.

Example 32 is a method, wherein the first data source comprises a collective position, a cyclic position, and pedal positions.

Example 33 is a method, wherein the actuator displacement comprises a gain on the input to control blade position.

Example 34 is a method, wherein the actuator displacement comprises a gain on the input to control a tail rotor.

Example 35 is a method, further comprising providing a virtual hard stop.

Example 36 is a method, wherein the secondary condition comprises airspeed.

Example 37 is a method, wherein the data structure comprises bucketized gain curves according to ranges of the secondary condition.

Example 38 is a method, wherein the secondary condition comprises airspeed.

Example 39 is a method, wherein the ranges include substantially 0-80 knots, 80-120 knots, 120-160 knots, 160-180 knots, 180-216 knots, and greater than 216 knots.

Example 40 is a method, wherein the secondary condition comprises at least one of airspeed, acceleration, adverse environment, inceptor acceleration, air temperature, ambient pressure, and weapon status.

Example 41 is a method, wherein the first data source is a collective input position, the secondary condition is an airspeed, and translating the flight control displacement comprises applying the gain according to the collective input position and the airspeed, and adding a yaw modifier to compute the actuator displacement.

Example 42 is a method, wherein the secondary condition is an ambient or environmental factor.

Example 43 is a rotary aircraft, comprising: an operator flight control system; an engine; a rotor blade drive system mechanically coupled to the engine; a fly-by-wire control system comprising electronically controllable actuators to adjust flight control surfaces to affect yaw, pitch, and roll of the rotary aircraft; an environmental sensor; and a flight computer comprising a processor microcircuit and logic to: receive an input from the flight control system; receive an environmental datum from the environmental sensor; query an n-dimensional ratio table, n>2, for an actuator ratio according to the input and the environmental datum; and actuate the fly-by-wire control system according to the actuator ratio.

Example 44 is a rotary aircraft, wherein the flight control system comprises an inceptor.

Example 45 is a rotary aircraft, wherein the flight control system comprises a collective, a cyclic, and pedals.

Example 46 is a rotary aircraft, wherein the actuator ratio comprises an actuator gain to control blade position.

Example 47 is a rotary aircraft, wherein the actuator ratio comprises an actuator gain to control a tail rotor.

Example 48 is a rotary aircraft, wherein the flight computer is further to provide a virtual hard stop.

Example 49 is a rotary aircraft, wherein the environmental datum comprises airspeed.

Example 50 is a rotary aircraft, wherein the n-dimensional ratio table includes bucketized gain curves according to ranges of the environmental datum.

Example 51 is a rotary aircraft, wherein the environmental datum comprises airspeed.

Example 52 is a rotary aircraft, wherein the ranges include substantially 0-80 knots, 80-120 knots, 120-160 knots, 160-180 knots, 180-216 knots, and greater than 216 knots.

Example 53 is a rotary aircraft, wherein the environmental datum comprises at least one of airspeed, acceleration, adverse environment, inceptor acceleration, air temperature, ambient pressure, and weapon status.

Example 54 is a rotary aircraft, wherein the input is a collective input position, the environmental datum is an airspeed, the actuator ratio comprises a gain, and actuating the fly-by-wire control system comprises computing a gain function from the collective input position, the airspeed, and the gain, and adding a yaw modifier to adjust the flight control surfaces.

Example 55 is a rotary aircraft, wherein the environmental datum is an ambient or environmental factor.

The diagrams in the FIGURES illustrate the architecture, functionality, and operation of possible implementations of various embodiments of the present disclosure. It should also be noted that, in some alternative implementations, the function(s) associated with a particular block may occur out of the order specified in the FIGURES. For example, two blocks shown in succession may, in fact, be executed substantially concurrently, or the blocks may sometimes be executed in the reverse order or alternative orders, depending upon the functionality involved.

The embodiments described throughout this disclosure provide numerous technical advantages, including by way of example, maintaining performance at high angles of attack while increasing performance at low angles of attack.

Although several embodiments have been illustrated and described in detail, numerous other changes, substitutions, variations, alterations, and/or modifications are possible without departing from the spirit and scope of the present disclosure, as defined by the appended claims. The particular embodiments described herein are illustrative only, and may be modified and practiced in different but equivalent manners, as would be apparent to those of ordinary skill in the art having the benefit of the teachings herein. Those of ordinary skill in the art would appreciate that the present disclosure may be readily used as a basis for designing or modifying other embodiments for carrying out the same purposes and/or achieving the same advantages of the embodiments introduced herein. For example, certain embodiments may be implemented using more, less, and/or other components than those described herein. Moreover, in certain embodiments, some components may be implemented separately, consolidated into one or more integrated components, and/or omitted. Similarly, methods associated with certain embodiments may be implemented using more, less, and/or other steps than those described herein, and their steps may be performed in any suitable order.

Numerous other changes, substitutions, variations, alterations, and modifications may be ascertained to one of ordinary skill in the art and it is intended that the present disclosure encompass all such changes, substitutions, variations, alterations, and modifications as falling within the scope of the appended claims.

One or more advantages mentioned herein do not in any way suggest that any one of the embodiments described herein necessarily provides all the described advantages or that all the embodiments of the present disclosure necessarily provide any one of the described advantages. Note that in this Specification, references to various features included in "one embodiment," "example embodiment," "an embodiment," "another embodiment," "certain embodiments," "some embodiments," "various embodiments," "other embodiments," "alternative embodiment," and the like are intended to mean that any such features are included in one or more embodiments of the present disclosure, but may or may not necessarily be combined in the same embodiments.

As used herein, unless expressly stated to the contrary, use of the phrase "at least one of," "one or more of" and "and/or" are open ended expressions that are both conjunctive and disjunctive in operation for any combination of named elements, conditions, or activities. For example, each of the expressions "at least one of X, Y and Z," "at least one of X, Y or Z," "one or more of X, Y and Z," "one or more of X, Y or Z" and "A, B and/or C" can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms "first," "second," "third," etc., are intended to distinguish the particular nouns (e.g., element, condition, module, activity, operation, etc.) they modify. Unless expressly stated to the contrary, the use of these terms is not intended to indicate any type of order, rank, importance, temporal sequence, or hierarchy of the modified noun. For example, "first X" and "second X" are intended to designate two X elements that are not necessarily limited by any order, rank, importance, temporal sequence, or hierarchy of the two elements. As referred to herein, "at least one of," "one or more of," and the like can be represented using the "(s)" nomenclature (e.g., one or more element(s)).

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the Specification, to limit this disclosure in any way that is not otherwise reflected in the appended claims.

What is claimed is:

1. A flight control computer for a rotary aircraft, comprising:
    a first interface to communicatively couple to a flight control input;
    a second interface to communicatively couple to flight geometry actuators;
    a data source;
    a multi-dimensional lookup table comprising a data structure to correlate flight control inputs to flight geometry actuator outputs according to a third-factor; and
    circuitry and logic instructions to:
        receive an input via the first interface;
        query the data source for the third-factor;
        query the multi-dimensional lookup table for a control input modifier according to the flight control input and the third-factor; and
        compute and send via a third interface a flight geometry output according to the control input modifier.

2. The flight control computer of claim 1, wherein the control input modifier is a gain.

3. The flight control computer of claim 1, wherein the flight geometry output comprises an actuator to control blade position.

4. The flight control computer of claim 1, wherein the flight geometry output comprises an actuator to control a tail rotor.

5. The flight control computer of claim 1, wherein the circuitry and logic instructions are further to provide a virtual hard stop.

6. The flight control computer of claim 1, wherein the third-factor comprises airspeed.

7. The flight control computer of claim 1, wherein the data structure comprises bucketized gain curves according to ranges of the third-factor.

8. A method of electronically controlling a rotorcraft, comprising:
    receiving via a first data source a flight control displacement;
    receiving via a second data source a secondary condition;
    querying a data structure with the flight control displacement and the secondary condition; and
    translating the flight control displacement into an actuator displacement according to a gain value received from the data structure.

9. The method of claim 8, further comprising driving an actuator according to the actuator displacement.

10. The method of claim 8, wherein the first data source comprises an inceptor.

11. The method of claim 8, wherein the data structure comprises bucketized gain curves according to ranges of the secondary condition.

12. The method of claim 11, wherein the secondary condition comprises airspeed.

13. The method of claim 12, wherein the ranges include substantially 0-80 knots, 80-120 knots, 120-160 knots, 160-180 knots, 180-216 knots, and greater than 216 knots.

14. The method of claim 8, wherein the secondary condition comprises at least one of airspeed, acceleration, adverse environment, inceptor acceleration, air temperature, ambient pressure, and weapon status.

15. The method of claim 8, wherein the first data source is a collective input position, the secondary condition is an airspeed, and translating the flight control displacement comprises applying the gain according to the collective input position and the airspeed, and adding a yaw modifier to compute the actuator displacement.

16. A rotary aircraft, comprising:
    an operator flight control system;
    an engine;
    a rotor blade drive system mechanically coupled to the engine;
    a fly-by-wire control system comprising electronically controllable actuators to adjust flight control surfaces to affect yaw, pitch, and roll of the rotary aircraft;
    an environmental sensor; and
    a flight computer comprising a processor microcircuit and logic to:
        receive an input from the flight control system;
        receive an environmental datum from the environmental sensor;
        query an n-dimensional ratio table, n>2, for an actuator ratio according to the input and the environmental datum; and actuate the fly-by-wire control system according to the actuator ratio.

17. The rotary aircraft of claim 16, wherein the flight control system comprises an inceptor.

18. The rotary aircraft of claim 16, wherein the flight control system comprises a collective, a cyclic, and pedals.

19. The rotary aircraft of claim 16, wherein the actuator ratio comprises an actuator gain to control blade position.

20. The rotary aircraft of claim 16, wherein the actuator ratio comprises an actuator gain to control a tail rotor.

* * * * *